(12) United States Patent
Klapman (10) Patent No.: US 12,069,060 B2
(45) Date of Patent: Aug. 20, 2024

(54) REMOTE REGISTRATION OF A DATA STORAGE DEVICE WITH BIOMETRIC AUTHENTICATION

(71) Applicant: Western Digital Technologies, Inc., San Jose, CA (US)

(72) Inventor: Matthew Harris Klapman, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 454 days.

(21) Appl. No.: 17/359,644

(22) Filed: Jun. 28, 2021

(65) Prior Publication Data

US 2022/0417249 A1    Dec. 29, 2022

(51) Int. Cl.
| | |
|---|---|
| *H04L 9/40* | (2022.01) |
| *G06F 21/32* | (2013.01) |
| *G06F 21/60* | (2013.01) |
| *G06V 40/13* | (2022.01) |
| *G06V 40/50* | (2022.01) |

(52) U.S. Cl.
CPC ............ *H04L 63/102* (2013.01); *G06F 21/32* (2013.01); *G06F 21/602* (2013.01); *G06V 40/13* (2022.01); *G06V 40/50* (2022.01); *H04L 63/0861* (2013.01); *H04L 63/126* (2013.01); *G06F 2221/2117* (2013.01)

(58) Field of Classification Search
CPC . H04L 63/102; H04L 63/0861; H04L 63/126; H04L 63/0428; H04L 9/0894; H04L 9/3231; G06F 21/32; G06F 21/602; G06F 21/6218; G06F 21/79; G06F 21/80; G06F 2221/2117; G06V 40/13; G06V 40/50
See application file for complete search history.

(56) References Cited

U.S. PATENT DOCUMENTS

| | | | | |
|---|---|---|---|---|
| 6,496,595 | B1 * | 12/2002 | Puchek ................... | G07C 9/38 |
| | | | | 382/116 |
| 11,265,152 | B2 * | 3/2022 | Mastenbrook ........ | H04L 9/0866 |
| 11,334,677 | B2 * | 5/2022 | Mastenbrook ........ | G06F 21/602 |
| 11,366,933 | B2 * | 6/2022 | Mastenbrook ........ | H04L 9/0891 |
| 11,469,885 | B2 * | 10/2022 | Mastenbrook ........ | H04L 9/0841 |
| 11,556,665 | B2 * | 1/2023 | Mastenbrook ........ | G06F 21/602 |

(Continued)

OTHER PUBLICATIONS

International Search Report and Written Opinion for International Application No. PCT/US2022/017340, mailed Jun. 27, 2022, 10 pgs.

*Primary Examiner* — Han Yang
(74) *Attorney, Agent, or Firm* — Patent Law Works LLP (57) ABSTRACT

A data storage device including a biometric reader for biometric authentication to enable access to a storage medium. The data storage device is configured for remote registration of a remote user of the data storage device, wherein registration includes receiving a record of a biometric authentication data set of the remote user from a secure database. Alternatively, a secure authorizing command is received remotely from an authorization server to enable the data storage device to directly read and store biometric data of the remote user. The data storage device can be unlocked by biometric authentication to enable a host device to access user data in the storage medium.

18 Claims, 7 Drawing Sheets

(56) References Cited

U.S. PATENT DOCUMENTS

| | | | |
|---|---|---|---|
| 2002/0073340 A1* | 6/2002 | Mambakkam | G06F 21/32 |
| | | | 713/186 |
| 2005/0154920 A1 | 7/2005 | Tartaglia et al. | |
| 2006/0206722 A1* | 9/2006 | Zhang | G07C 9/38 |
| | | | 713/186 |
| 2012/0291111 A1 | 11/2012 | Kamakura | |
| 2017/0249451 A1 | 8/2017 | Andreeva | |
| 2018/0287789 A1* | 10/2018 | Sridharan | H04L 63/0428 |
| 2021/0218557 A1* | 7/2021 | Mastenbrook | H04L 9/3263 |
| 2023/0195912 A1* | 6/2023 | Saxena | G06F 21/44 |
| | | | 726/20 |
| 2023/0289089 A1* | 9/2023 | Mastenbrook | G06F 21/604 |
| | | | 713/189 |
| 2023/0289456 A1* | 9/2023 | Mastenbrook | G06F 21/606 |
| | | | 726/26 |
| 2023/0291548 A1* | 9/2023 | Mastenbrook | H04L 9/0825 |
| | | | 713/171 |

* cited by examiner

REMOTE REGISTRATION OF A DATA STORAGE DEVICE WITH BIOMETRIC AUTHENTICATION

TECHNICAL FIELD

This disclosure relates to a data storage device that can be unlocked with biometric authentication means to enable a host device to access a storage medium of the data storage device.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

External DSDs are commonly used to supplement the data storage capabilities of a computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the external drive as a block data storage device such that a user of the device may access the storage of the drive via the data path (e.g., through operation of the host computer). Access to the drive typically enables a user to access (e.g., read, write and/or modify) user content data stored on the drive.

Some DSDs may be secured against access by unauthorized parties. This can include selectively locking and unlocking the DSD. An authorized party may selectively unlock the DSD by authenticating the authorized party to the host computer system or DSD.

SUMMARY

Aspects of the present disclosure seek to facilitate registration and authentication of a remote user of a data storage device.

Disclosed herein is a data storage device comprising: a storage medium configured to store user content data; a memory configured to store authentication data sets; a communication interface to communicatively couple with one or more host devices; and at least one processor. The at least one processor is configured to register a remote user, wherein the processor is configured to: receive from a secure database, a record of a biometric authentication data set of the remote user; and store the record of the biometric authentication data set of the remote user in the memory. The at least one processor is also configured to authenticate the remote user, wherein the processor is configured to: receive, from a biometric reader, biometric data of the remote user; verify that the biometric data corresponds to the record of the biometric authentication data set of the remote user stored in the memory; and based on verification of the biometric data of the remote user, unlock the data storage device to enable access to the storage medium of the data storage device to a remote user host device via the communication interface.

In some embodiments of the data storage device, the communication interface is further configured to communicatively couple the data storage device to an administrator host device, or an initial user host device, wherein to receive the record of the biometric authentication data set of the remote user, the processor is further configured to: receive the record of the biometric authentication data set of the remote user from the administrator host device or the initial user host device to the data storage device, and wherein the record of the biometric authentication data set is transmitted via the administrator host device or initial user host device in response to a request for the record of the biometric authentication data set of the remote user.

In some embodiments of the data storage device, the communication interface is configured to communicatively couple the data storage device with the remote user host device that is in communication, over a network, to the secure database to enable the processor to register the remote user, wherein to receive the record of the biometric authentication data set of the remote user, the processor is further configured to: receive the record of the biometric authentication data set of the remote user from the coupled remote user host device to the data storage device. The record of the biometric authentication data set is transmitted via the remote user host device in response to a request for the record of the biometric authentication data set of the remote user.

In some embodiments the data storage device further comprises an access controller to selectively set a data access state comprising: an unlocked state to enable access to the storage medium, wherein in the unlocked state the access controller generates a physical enable signal to enable data exchange through a data path between the storage medium and the remote user host device; and a locked state to prevent access to the storage medium, wherein in the locked state the data storage device is configured to disable the data path to prevent data exchange between the storage medium and the remote user host device.

In some embodiments the data storage device further comprises a cryptography engine, wherein when the processor unlocks the data storage device to enable access to the storage medium, the cryptography engine is configured to: receive user content data from one or more host devices and generate encrypted user content data to be stored on the storage medium; and receive encrypted user content data from the storage medium and generate decrypted user content data to be sent to the remote user host device.

In further embodiments, the cryptography engine is configured to apply one or more cryptographic keys to encrypt user content data and decrypt user content data, wherein the one or more cryptographic keys is based, at least in part, on the record of the biometric authentication data set of the remote user.

In some embodiments, the data storage device is further configured to: receive, from an administrator host device or an initial user host device communicatively coupled to the data storage device, initial user content data to be accessed by the remote user, and store the initial user content data in the storage medium, wherein based on verification of the biometric data of the remote user, the processor is further configured to unlock the data storage device to enable the remote user host device to access to the initial user content data.

In some embodiments the data storage device further comprises a biometric reader. In further embodiments, the biometric reader is a fingerprint scanner.

Disclosed herein is a method of biometric authentication at a data storage device, the method comprising: registering a remote user, wherein registering the remote user comprises: receiving, from a biometric reader, registration biometric data of a remote user; receiving, from an authorization server, a secure authorizing command, wherein in response to receiving the secure authorizing command the method further comprises: storing, in a memory of the data storage device, a record of a biometric authentication data set of the remote user based on the received registration biometric data of the remote user, wherein the record of the biometric authentication data set enables authentication of the remote user and to enable access to a storage medium of the data storage device.

In some embodiments, registering a remote user further comprises: sending a request for the secure authorizing command to the authorization server, wherein the request is accompanied by alternate authentication data.

In some embodiments, the method further comprises: authenticating the remote user, wherein authenticating the remote user comprises: receiving, from the biometric reader, biometric data of the remote user; verifying that the biometric data corresponds to the record of the biometric authentication data set of the remote user stored in the memory; and based on verification of the biometric data of the remote user, unlocking the data storage device to enable access to a storage medium of the data storage device to the remote user host device.

In further embodiments of the method, wherein to enable access to the storage medium further comprises generating a physical enable signal to enable data exchange through a data path between the storage medium and the remote user host device.

In further embodiments of the method, wherein unlocking the data storage device to enable access to the storage medium comprises: receiving user content data from the remote user host device and generating encrypted user content data to be stored on the storage medium; and receiving encrypted user content data from the storage medium and generating decrypted user content data to be sent to the remote user host device.

In some embodiments of the method, a cryptography engine is configured to apply one or more cryptographic keys to encrypt user content data and decrypt user content data. wherein the one or more cryptographic keys is based, at least in part, on the record of the biometric authentication data set of the remote user.

In some embodiment of the method, a cryptography engine is configured to apply one or more cryptographic keys to encrypt user content data and decrypt user content data, wherein the one or more cryptographic keys is based, at least in part, on the received secure authorizing command.

Disclosed herein is a data storage device comprising: means for storing user content data; means for registering a remote user, wherein the means for registering the remote user comprises; means for receiving from an authorization server; a record of a biometric authentication data set of a remote user from a secure database; or a secure authorizing command to authorize receipt of a record of the biometric authentication data set of the remote user; and means for storing the record of the biometric authentication data set of the remote user. The data storage device also comprising: means for authenticating the remote user, wherein authenticating the remote user comprises: means for receiving biometric data of the remote user; means for verifying that the biometric data of the remote user corresponds to the record of the biometric authentication data set; and means for unlocking the data storage device to enable a communicatively coupled host device access secured user content data stored in the means for storing user content data.

In some embodiment of the data storage device, the means for storing user content data includes initial user content data sent from an initial user host device, wherein the means for unlocking the data storage device enables the communicatively coupled host device, different to the initial user host device, to access the initial user content data in the means for storing user content data.

In some embodiments, the data storage device further comprises: means to send a request for the secure authorizing command to the authorization server.

In some embodiments, the data storage device further comprises: means to generate the record of the biometric authentication data set of the remote user with: the secure authorizing command; and biometric data of the remote user from the means for receiving biometric data.

Disclosed herein is a method of biometric authentication at a data storage device, the method comprising: registering a remote user, wherein registering the remote user comprises: receiving from a secure database, a record of a biometric authentication data set of the remote user; storing the record of the biometric authentication data set of the remote user in a memory of the data storage device. The method further comprises: authenticating the remote user, wherein authenticating the remote user comprises: receiving, with a biometric reader associated with the data storage device, biometric data of the remote user; verifying that the biometric data corresponds to the record of the biometric authentication data set of the remote user stored in the memory; based on verification of the biometric data of the remote user, unlocking the data storage device to enable access to a storage medium of the data storage device to a remote user host device.

In some embodiments of the method, registering the remote user comprises: communicatively coupling the data storage device to an administrator host device, or an initial user host device; wherein receiving the record of the biometric authentication data set of the remote user comprises: sending, from the administrator host device or the initial user host device, a request for the record of the biometric authentication data set of the remote user; receiving, at the administrator host device or the initial user host device, the record of the biometric authentication data set of the remote user from the secure data base; sending the record of the biometric authentication data set of the remote user from the administrator host device or the initial user host device to the data storage device.

In some embodiments of the method, registering the remote user comprises: communicatively coupling the data storage device with the remote user host device; wherein receiving the record of the biometric authentication data set of the remote user comprises: sending, from the remote user host device, a request for the record of the biometric authentication data set of the remote user; receiving, at the remote user host device, the record of the biometric authentication data set of the remote user over a network from the secure data base; sending the record of the biometric authentication data set of the remote user from the remote user host device to the data storage device.

BRIEF DESCRIPTION OF DRAWINGS

Examples of the present disclosure will now be described with reference to the following drawings.

DESCRIPTION OF EMBODIMENTS

Biometric data can be used to authenticate a data storage device locally. An example is using fingerprint to unlock a phone or data storage device. Other biometric data such as iris patterns, facial structures, hand measurements, typing gait, etc. can be used to unlock a local device. A drawback of known techniques is that the only people who can unlock the device must initially have physical possession of the device in order to register their biometric data at the device. This can be problematic for users working in remote locations. In particular, in situations where it is desirable to send sensitive data to a remote user on a secured data storage device. If the remote user did not previously register their biometric information, they would not be able to access the secured sensitive data.

The present disclosure is directed to enable remote registration of biometric data in the data storage device. This may be applicable in situations where the remote user is physically separate (i.e. remote) from an administrator, initial user, and the respective devices of the administrator or initial user. A key advantage is registering the biometric data to a secure storage device that is physically sent to the remote user who can then unlock the device. While the biometric data can exist in an online server, the ability to keep the biometric data only on the storage device improves the security threat profile.

Overview

Figure 1:
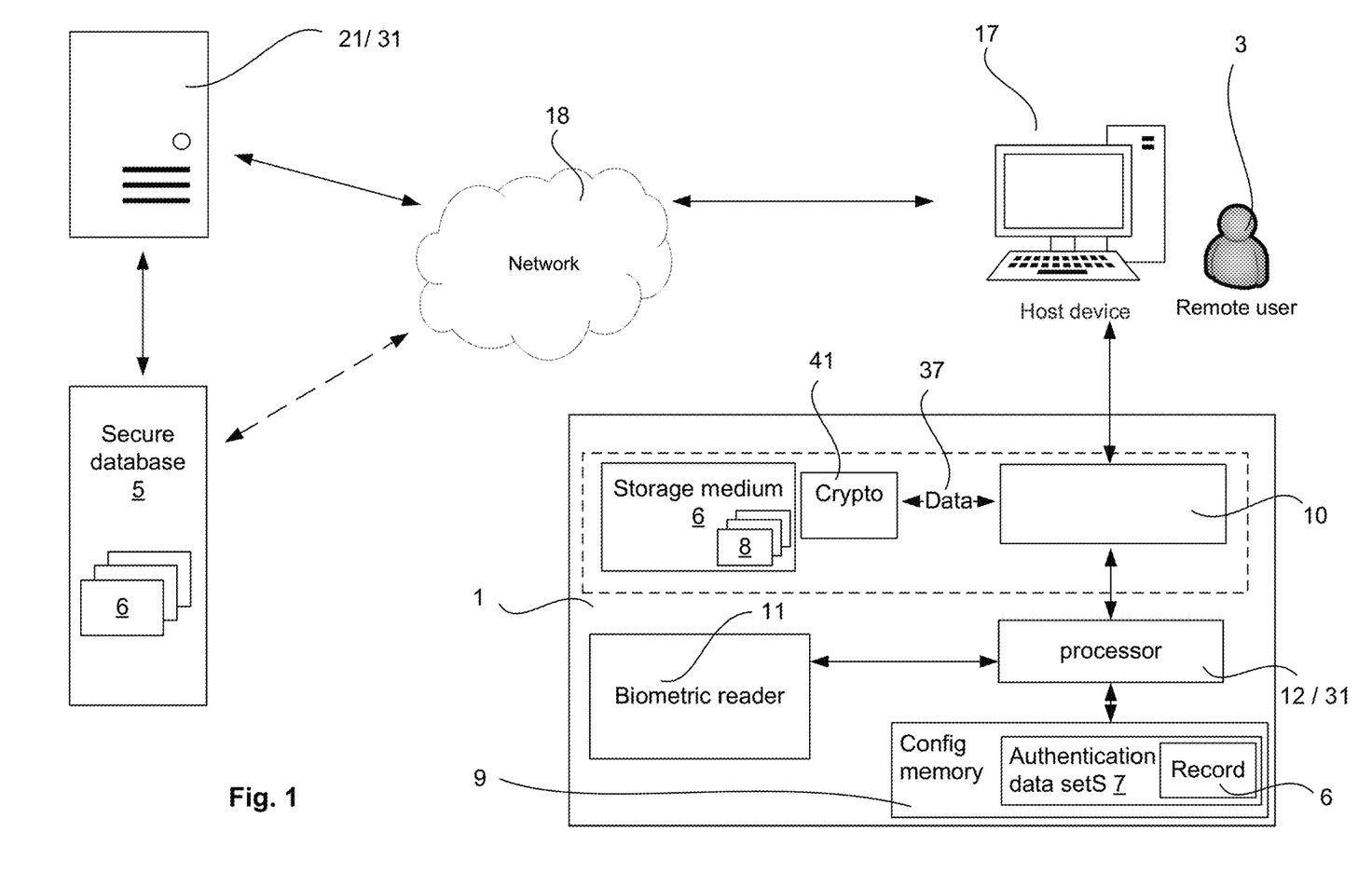
FIG. 1 is a schematic diagram of a system including a data storage device communicatively coupled to a remote user host device that, in turn, is in communication with a secure database.

FIG. 1 illustrates an example of a data storage device 1 that can be selectively unlocked by biometric authentication. The data storage device 1 includes a storage medium 6 to securely store user data 8, a biometric reader 11 to read biometric data of a user, a memory 9 to store authentication data sets used for authentication, and a communication interface 10 to communicatively couple with one or more host devices 17. There is also a processor 12 configured to register 110, 210 a remote user 3 to the data storage device 1. The processor 12 is also configured to authenticate 140, 240 the remote user 3 to enable a remote user host device 17 to access the storage medium 6.

FIG. 1 also illustrates a secure database 5 that is in communication with the remote user host device 17 via a network 18, such as the internet or other communications network. The secure database 5 can store records of biometric authentication data sets, such as a record 6 of a biometric authentication data set 7 of the remote user 3. FIG. 1 also illustrates an administrator host device 21, or an authorization server 31, that can be in communication with the host device 17 via the network. In some examples, the secure database 5 is in secure communication with the administrator host device 21, or authorization server 31 without passing through the network 18.

The secure data base 5, administrator host device 21, and the authorization server 31 can be located physically away from the remote user 3 and the corresponding remote user host device 17. An example of remote registration will now be described.

Figure 2:
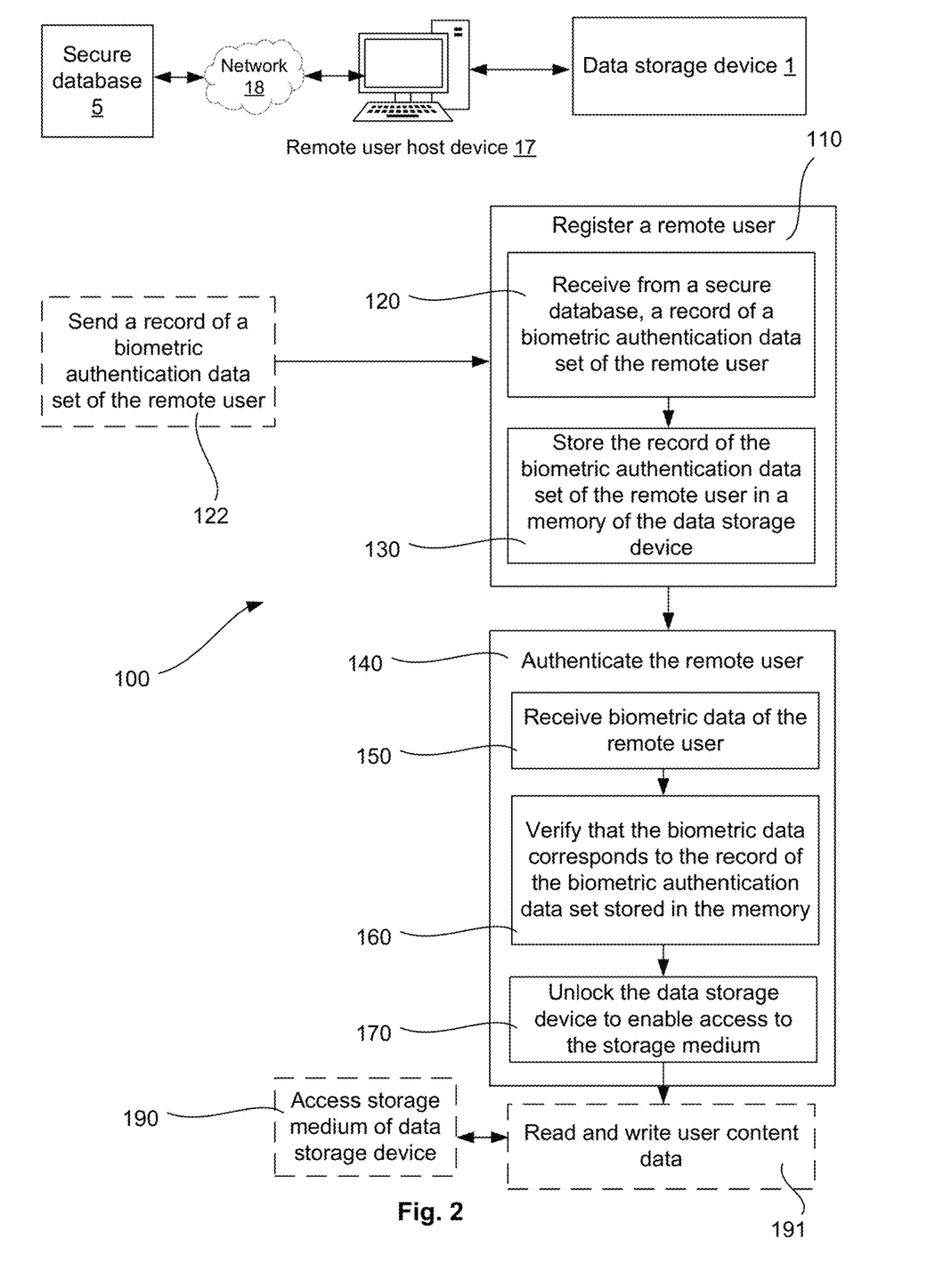
FIG. 2 illustrates an example method of remote registering of a remote user and biometric authentication of the remote user at a data storage device.

In a one example, with reference to the method 100 illustrated in FIG. 2, registration of a remote user 3 includes sending the remote user's record 9 of biometric authentication data set 7 to the data storage device 1. The data storage device 1 is connected to a host device (such as the remote user device 17, administrator host device 21, or secure database 5) and the processor 12 receives 120, directly or indirectly from the secure database 5, the record 6 of the biometric authentication data set 7 of the corresponding remote user 3 to be registered. The method further includes storing 130 the record 6 in the memory 9 of the data storage device 1.

Figure 5:
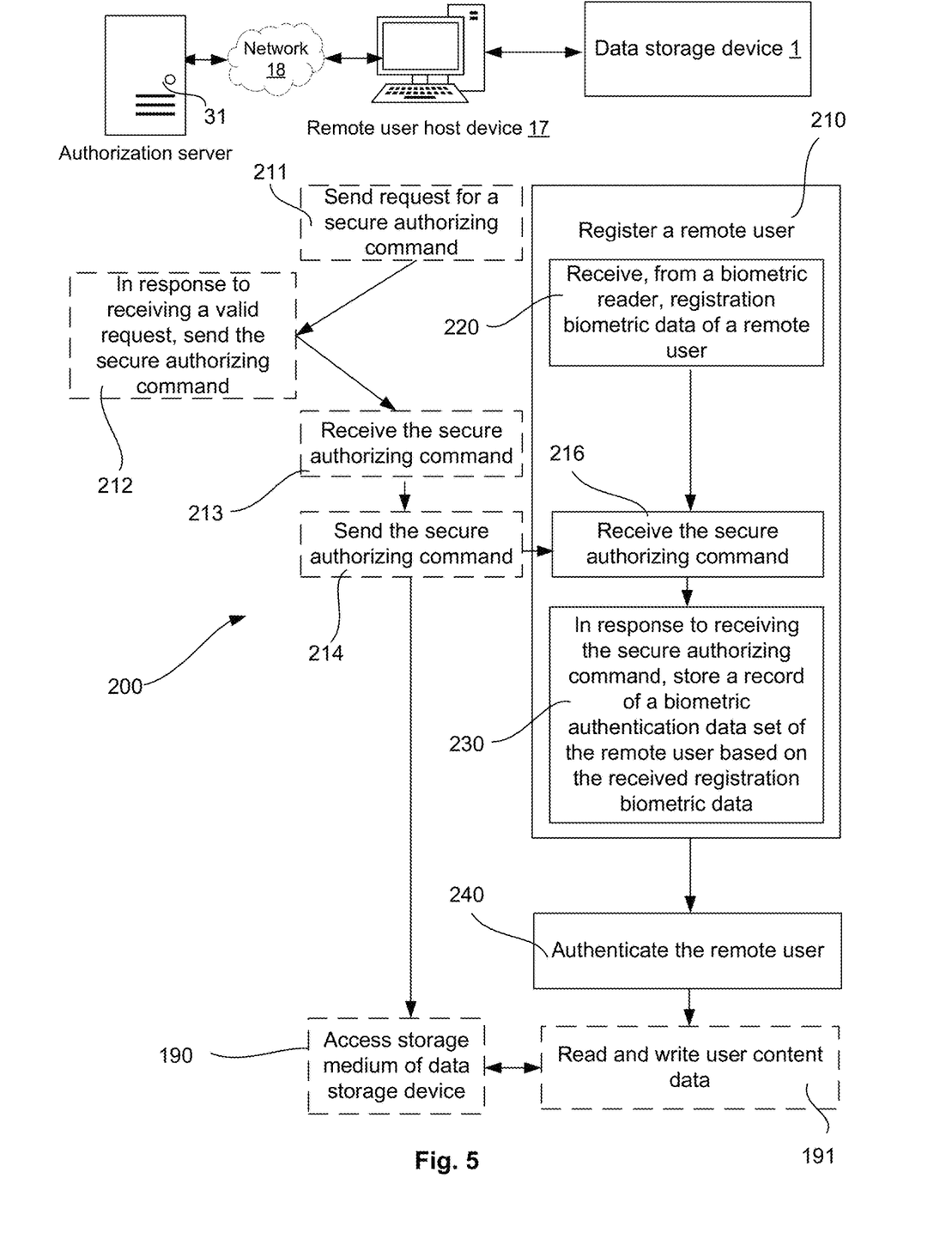
FIG. 5 illustrates an example of remote registering of a remote user to the data storage device by the remote user host device wherein registration is enabled by receiving a secure authorizing command from the authorization server.

In another example, with reference to the method 200 illustrated in FIG. 5, registration of a remote user 3 involves the remote user 3 presenting their personal biometric features to the biometric reader 11 of the data storage device 1. This includes receiving 220, from the biometric reader 11, registration biometric data 14 directly from the remote user 3. This typically involves the remote user 3 and remote user device 17 being physically co-located with the data storage device 1. The method 200 also includes receiving 216, from an authorization server 31, a secure authorizing command 33. The authorization server 31 can typically be located physically remote from the data storage device 1, remote user 3, and remote user device 17. In response to receiving 216 the secure authorizing command 33, the method 200 further comprises storing 230 a record 6 of a biometric authentication data set 7 of the remote user 3 that is based on the received registration biometric data 14.

Figure 6:
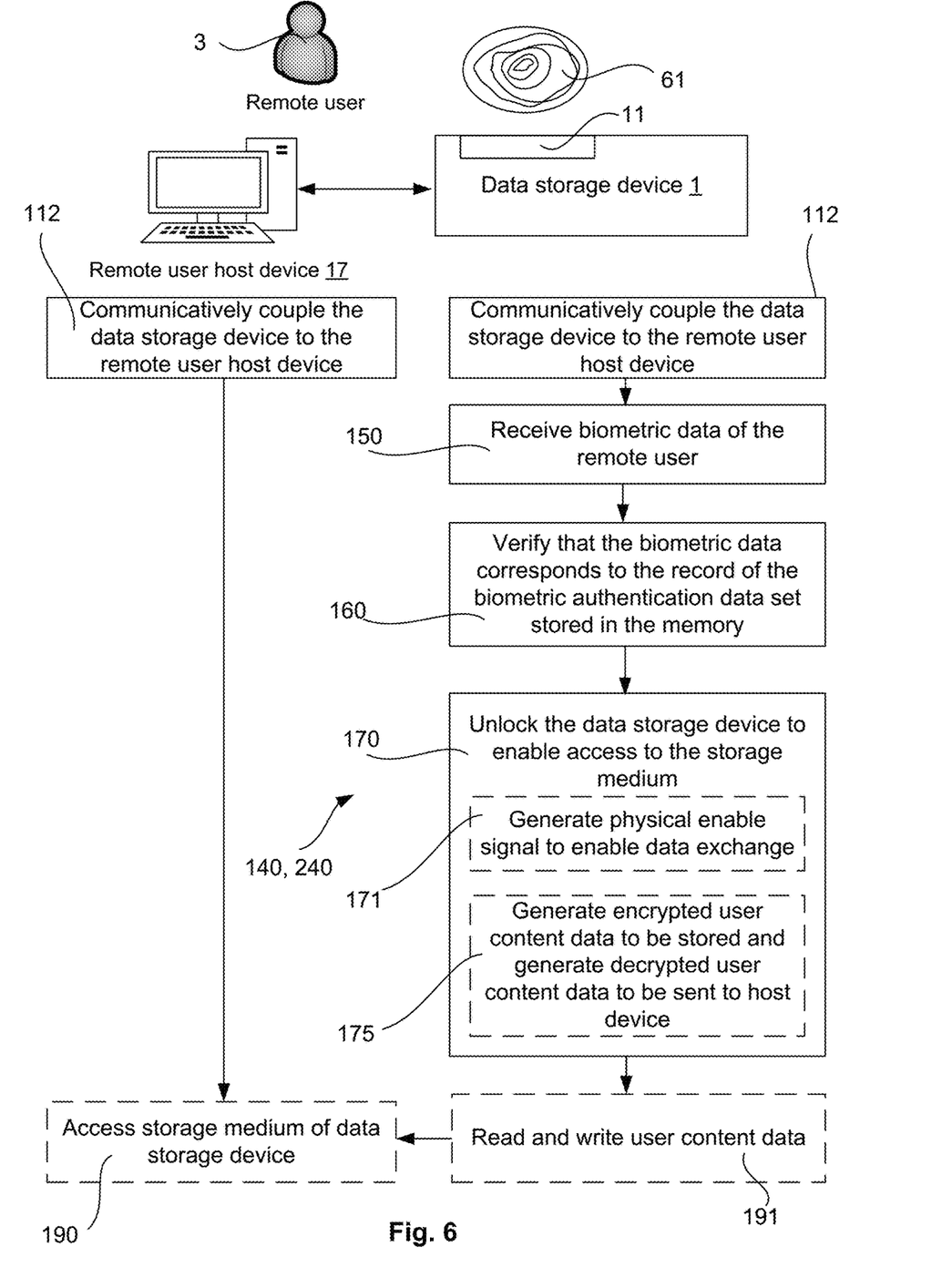
FIG. 6 illustrates a further example of biometric authentication of the data storage device communicatively coupled to the remote user host device.

An example of authenticating 140, 240 the remote user 3 to enable access to the storage medium 6 of the data storage device 3 will now be described with reference to FIGS. 2 and 6. This includes receiving 150, 250, with the biometric reader 11, the biometric data 13 presented by the remote user 3. As an example, this may include presenting a finger 61 for fingerprint scanning, an eye for iris pattern scanning, a face to scan facial structures, etc. The method further includes verifying 160, 260 that the biometric data 13 corresponds to one or more valid records 6 of biometric authentication data sets 7 of the remote user 3 stored in the memory 9. Based on verification of the biometric data of the remote user 3, the method further includes unlocking 170, 270 the data storage device 1 to enable the remote user host device 17 to access 190 the storage medium 15 of the data storage device 1.

Examples of the present disclosure may advantageously allow a remote user 3 to register their biometric data with a data storage device 1 whilst they are physically remote from an administrator, other users, and their respective computing devices.

This may be useful in collaborative situations where remote workers need to pass information securely (such as sending by secure courier, a physical data storage device containing user content data). For example, an initial user can store data securely in the data storage device 1, whereby the data storage device is selectively locked. Advantageously, the data storage device 1 does not need to be pre-registered by the recipient physically presenting their biometrics to that particular data storage device 1. The initial user can then physically send the data storage device 1 to a recipient at a remote location. The authorized recipient of the data storage device, once registered, can use their personal biometrics to unlock the data storage device 1 and access 190 data stored therein.

The Data Storage Device 1

Features of an example of the data storage device 1 will now be described with reference to FIG. 1. It is to be appreciated that alternative examples may include more, or less, features.

Storage Medium 6

A function of the data storage device 1 is to register with the host device 17 as a mass data storage device providing the functionality to the operating system of the host device 17 of a block data storage device. Data storage device 1 includes a non-transitory storage medium 6 to store user content data. In some examples, this includes unencrypted user content data. In other examples, the storage medium 6 stores encrypted user content data. The user content data is the data that a user would typically want to store on a data storage device, such as files including image files, documents, video files, etc. The storage medium may be a solid state drive (SSD), hard disk drive (HDD) with a rotating magnetic disk or other non-volatile storage media. Further, the storage medium may be a block data storage device, which means that the user content data is written in blocks to the storage medium 6 and read in blocks from the storage medium 6.

Communication Interface 10

The communication interface 10 enables communication between the data storage device 1 and the host device 17. In this example, the one function is to provide a wire-based data port between the host device 17 and components of the data storage device 1. In a preferred example, this includes a USB (universal serial bus) bridge to enumerate with the host device 17.

In use, the data storage device 1 can appear, from the perspective of the host device 17 as a peripheral mass data storage device, whereby the host uses the storage medium 6 to store, read, and write, user content data.

Processor 12 and Memory 9

The processor 12 is associated with memory 9 storing software to implement the method described herein. It is to be appreciated that the processor 12 can include multiple processors to facilitate performance of the method. This includes the steps of registering 110, 210 the remote user 3. This can also include the steps of authenticating 140, 240 the remote user 3.

The at least one processor 12 is also involved with unlocking 170, 270 the data storage device 1 to enable access 190 to the storage medium 6. That is, the at least one processor 12 may perform, at least in part, access control, including selectively enabling access between the storage medium 6 and the host device 7.

In one example, this can include enabling access by sending a cryptographic key to the cryptography engine 41 when authentication requirements are satisfied. This may be responsive to receiving valid biometric data 13 at the biometric reader 11, wherein the biometric data corresponds to the record 6 of the biometric authentication data set stored in the memory 9. Examples of the cryptography engine 41 will be discussed under a separate heading below.

In another example, the processor 12 acting as an access controller, or a separate access controller 31, can selectively set a data access state that includes, an unlocked state, and a locked state. The access controller is configured to generate 171 a physical enable signal to control the data path 37 such as to enable or disable the transmission of user content data 109 between the host device 17 and the non-volatile storage medium 6 via the communication interface 10. This can include operating switches to enable or disrupt a physical data path 37. The state of the data path 37, as either enabling or disabling data transmission, is referred to as a physical access state of the data storage device 1.

Access control by encryption and decryption of user content data in the storage medium 6 may operate independently or in conjunction with the physical access state. That is, the data storage device 1 may be, in part unlocked, to enable transmission of data through the path 37, while the cryptographic state of a subset of user content data in the storage medium 6 is encrypted. This may be desirable if the data storage device 1 is a shared resource and that a specific remote user 3 is only authorized to access a subset of user content data stored on the data storage device. For example, if the data storage device is partitioned to multiple volumes, it may be desirable to enable a physical access state for the data path 37 so that a specific remote user 3 can access a volume they are authorized to access. The data storage device may, at the same time, be configured to prevent that specific remote user 3 from accessing user content data in other volumes they are not authorized to access by ensuring the corresponding user content data remains encrypted by the cryptography engine 41.

In one example, the at least one processor 7 may include a reduced instruction set computer (RISC). In one example, the at least one processor 7 is a Cortex M0 microcontroller from ARM Limited.

The interface between the at least one processor 12 and the communication interface 10 may be an inter-integrated circuit bus. However, it is possible to use many other communication architectures including bus, point-to-point, serial, parallel, memory based and other architectures. The separation of functionality in dedicated chips as illustrated in FIG. 1 is only an example of one implementation. It is possible to combine the functionalities or split the functionalities further. For example, the communication interface may be integrated with the at least one processor 12 into a single chip with a since core. In other cases, the communication interface 10 and the at least one processor 12 can be integrated with the cryptography engine 41 into a single dedicated chip with a single core. In other examples, the chips may have multiple cores.

Memory 9 stores data related to authentication, and in some examples, configuration of the data storage device 1. This may include data related to access control (such as records 6 of biometric authentication data sets 7 of authorized users, other data related to authentication and authorization, cryptographic keys, etc.), and other configuration parameters.

Firmware associated with the at least one processor 12 may be stored in the memory 9 or other non-volatile memory. This may include firmware to perform methods 100 and 200.

Cryptography Engine 41 and Access Controller 31

In one example, storage medium 6 includes or is associated with a cryptography engine 41 in the form of a dedicated and/or programmable integrated circuit that encrypts data to be stored on storage medium 6 and decrypts data to be read from storage medium 6. In such examples, the storage medium 6 may provide a Small Computer System Interface (SCSI) or Advanced Technology Attachment (ATA) command set according to the Opal specification by the Trusted Computing Group (TCG).

The cryptography engine 41 may be connected between the communication interface 10 and the storage medium 6. When the data storage device 1 is unlocked, the cryptography engine 41 is configured to use a cryptographic key to generate 175 encrypted user content data to be stored on the storage medium 6 and to generate decrypted the encrypted user content data stored on the storage medium 6 in response to a request from the host device 17 and/or the at least one processor 12. In some examples, the at least one processor 12 functions as an access controller and provides, at least in part, the cryptographic key to the cryptography engine 41. For example the at least one processor 12 sends the cryptographic key to cryptography engine 22 in response to successful verification of the biometric data 13 read at the biometric reader 11. In other examples, the at least one processor sends a signal to enable the cryptographic key to be sent directly from the memory 9 to the cryptography engine 22.

Biometric Reader 11

In some examples, the biometric reader 11 is a fingerprint scanner and the biometric data 13 includes, or is based on, the fingerprint of a user. In other examples, the biometric reader 11 may be based on scanning other biometrics such as the retina, iris, facial features, hand measurements, etc. This can include scanners that include cameras, or other image capture devices, LIDAR (light detection and ranging) scanners, etc.

First Example of a Method of Registering a Remote User 3

Figure 3:
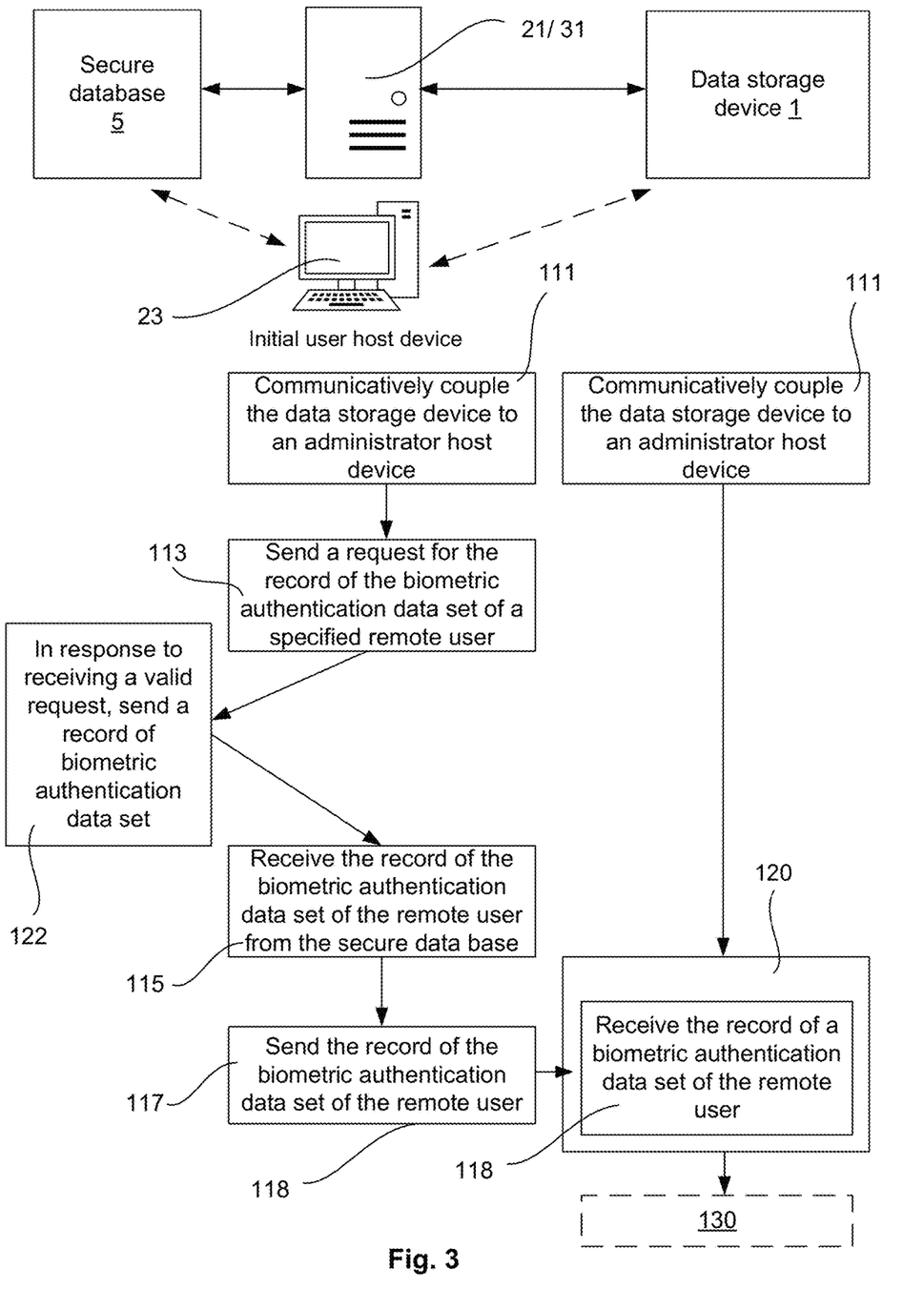
FIG. 3 illustrates an example of remote registering of a remote user to the data storage device by an administrator host device or initial user host device with a record of the remote user from the secure database.

An example of registering a remote user at an administrator host device or initial user host device will now be described with reference to FIG. 3. In some examples, this can be considered preloading a data storage device 1 with a remote user's record of biometric authentication data set 7 before the data storage device 1 is sent to the remote user 3. This is remote registration since registration of the data storage device 1 can be performed by the administrator host device or initial user host device physically away from the remote user 3 or their corresponding remote user device 17.

In this example, a secure database 5 stores records of biometric authentication data sets. This may include previously acquired records of multiple individuals, such as a secure database of records of employee or other authorized personnel. In some examples, this secure database may be populated by people providing biometric data during employee induction, or otherwise sending biometric data to be stored in a secure database 5. This can include sending digital images and scans (e.g. a photograph of fingerprints, the face, iris, or retina), or physical copies such as impressions of fingerprints using ink and paper.

The method 100 of registration includes communicatively coupling 111 the data storage device 1 to the administrator host device 21 or an initial user host device 23. The administrator host device 21 can be associated with person(s) who have administrator rights to the system, such as an information technology administrator for a company, or other organization. An initial user host device 23 can be associated with an initial user who may not have general administration rights, but is a user of the data storage device 1 before the data storage device 1 is provided to the remote user 3. The initial user may be a person collaborating with the remote user 3, and in some examples the initial user may wish to store initial user content data onto the data storage device 1 and, more importantly, enable the remote user 3 to subsequently access 190 that initial user content data.

The coupling of the data storage device 1 to the administrator host device 21 or initial user host device 23 enables record(s) of the biometric authentication data set of remote user(s) to be communicated to, and stored on, the data storage device 1. This is typically via the communication interface 10 of the data storage device 1.

This process includes the administrator host device 21, or initial user host device 23, sending 113 a request for a record of the biometric authentication data set of one or more specified remote user (s). The remote user(s) 3 are the intended recipient remote user(s) 3 that should desirably have access 190 to the storage medium of the data storage device 1.

The secure database 5, in response to receiving a valid request, sends 122 the record of the biometric authentication data set(s) to the administrator host device 21 or initial user host device 23. The validity of the request may be determined at the administrator host device 21, the secure database 5, or another computing node authorized to verify the request. In some examples, the secure database 5 is in communication with the administrator host device 21, such as in a local area network in a common facility. This can be advantageous in increasing security as the record of the biometric authentication data set does not need to be transmitted through a wide area network, the internet, or other form of communication network vulnerable to interception.

The administrator host device 21, or initial user host device 23, receives 115 the record 6 of the biometric authentication data set, and sends 117 the record 6 to the data storage device 1. The data storage device 1 receives 118 the record 6 and subsequently stores 130 the record in the memory 9 of the data storage device 1.

As a result, the record 6 of the biometric authentication data set of the intended remote user 3 is registered at the data storage device 1, and this record 6 can be used by the remote user 3 to subsequently unlock the data storage device.

It is to be appreciated that the data storage device 1 can be configured to receive multiple records 6 of biometric authentication data sets that correspond to respective multiple different users. This can be useful in a collaborative environment where a data storage device 1 is intended to be used by specified users (such as users in a team), and the administrator, or initial user, can register all the specified users. Importantly, this method can allow registration of the specified users without those users being physically present during registration.

Second Example of a Method of Registering a Remote User 3

Figure 4:
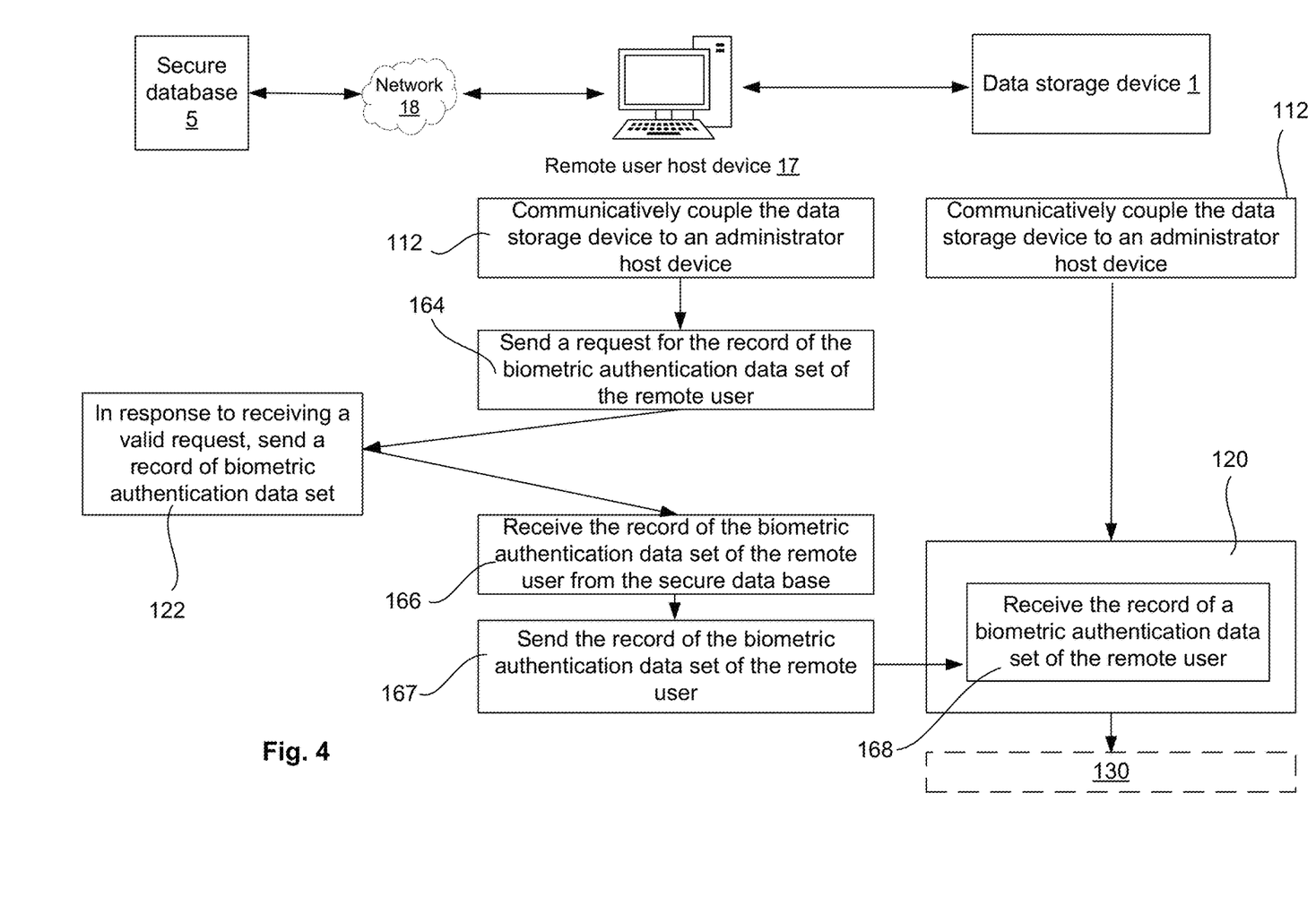
FIG. 4 illustrates an example of remote registering of a remote user to the data storage device by the remote user host device, wherein the record of the remote user is sent from the secure database, over a network, to the remote user host device.

A second example of registering a remote user will now be described with reference to FIG. 4. In this example, registration of the remote user 3 is performed when the data storage device 1 has been sent to the remote user 3. This is remote registration since registration of the data storage device 1 is performed whilst the data storage device 1, remote user 3, and remote user host device 17 is physically away from the secure database 5 that stores the records 6 of biometric authentication data sets.

Similar to the earlier example, the secure database 5 stores records of biometric authentication data sets that are based on previously acquired biometric data of the remote user. However, in this example the secure database 5 sends 122 the record(s) 6 of biometric authentication data sets, over a communication network 18, to the remote user host device 17. In turn, the remote user host device 17 sends the record 6 to the data storage device 1 for registration.

The method of registration includes communicatively coupling 112 the data storage device 1 to the remote user host device 17. The coupling of the data storage device 1 to the remote user host device 17 enables record(s) of the biometric authentication data set of remote user(s) to be communicated to, and stored on, the data storage device 1.

This process includes the remote user host device 17, sending 164 a request for a record of the biometric authentication data set of the remote user 3 (or other specified and authorized remote user(s)). Since the remote user device 17 is in a location physically remote from the secure database 5, the request is typically sent over a communications network 18. The communications network 18 can include the internet, wide area network, or other telecommunication network.

The secure database 5, in response to receiving a valid request, sends 122 the record of the biometric authentication data set(s), over the communication network 18, to the remote user host device 17. The validity of the request may be determined at the secure database 5, an administrator node, or another computing node authorized to verify the request.

The remote user host device 17 receives 166 the record 6 of the biometric authentication data set, and sends 167 the record 6 to the data storage device 1. The data storage device 1 receives 168 the record 6 and subsequently stores 130 the record in the memory 9 of the data storage device 1.

As a result, the record 6 of the biometric authentication data set of the intended remote user 3 is registered at the data storage device 1, and this record 6 can be used by the remote user 3 to subsequently unlock the data storage device.

Like the early examples, the method can also enable the remote user host device to request multiple records 6 of biometric authentication data sets that correspond to respective multiple different users. For example, a team that is located together at a remote location can request simultaneous (or near simultaneous) registration of the multiple team members at that remote location.

An advantage of this example method is the option to include or add further users remotely. In an illustrative example, a data storage device 1 is loaded with user content data and physically sent to a remote location with the intention of "Person A" as the recipient that should access 190 that user content data. During transit of the data storage device, it is determined that "Person A" was not suitable (e.g. became incapacitated, was terminated from employment, or was originally nominated in error etc.). It would be possible for an administrator to subsequently allow an alternative, such as "Person B", at the remote location to register so they can access the user content data. This can save returning the data storage device to the administrator to re-register, or having to send another data storage device 1. For security, the previously acquired record of biometric authentication data set for Person B is sent 122 for registration at the data storage device 1. This can give confidence to the administrator that only Person B can access that information.

Third Example of a Method of Registering a Remote User 3

A third example of registering a remote user will now be described with reference to FIG. 5. In this example, the method 200 includes registering a remote user 3 when the data storage device 1 is physically with the remote user 3. This is remote registration as the data storage device 1 is physically separated from an authorization server 31 that authorized registration of the remote user 3. In this example, the system does not have a secure database 5 to store record(s) of the biometric data of the user.

The method of registration includes, in some examples, communicatively coupling the data storage device 1 to the remote user host device 17 similar to the examples described above. The coupling of the data storage device 1 to the remote user host device 17 facilitates the secure authorizing command to be communicated to the data storage device 1.

This process includes the remote user host device 17, sending 211 a request for a secure authorizing command 33. This may be initiated by the remote user 3 by initiating a request through a user interface of the remote user host device 17. Since the remote user device 17 is in a location physically remote from the authorization server 31, the request is typically sent over a communications network 18. The communications network 18 can include the internet, wide area network, or other telecommunication network. In some examples, sending 211 the request can include alternate authentication data. The alternate authentication data may include a password, login, or other authentication means so that the authorization server 31 can authenticate the remote user 3 making the request.

The authorization server 31, in response to receiving a valid request, sends 212 the secure authorizing command 33, over the communication network 18, to the remote user host device 17. The validity of the request may be determined at the authorization server 31, an administrator node, or another computing node authorized to verify the request.

The remote user host device 17 receives 213 the secure authorizing command 33, and sends 214 the secure authorizing command 33 to the data storage device 1.

The data storage device 1 receives 216 the secure authorizing command 33 that enables registration of biometrics of the remote user 3. The method also includes receiving 220, from a biometric reader 11, registration biometric data 14 of the remote user 3. This can include registration biometric data 14 that is read from the biometric reader 11 of the data storage device 1. In alternate examples, the registration biometric data 14 may be obtained by another biometric reader associated with the remote user host device 17.

In some examples, the registration process includes receiving 220 the remote user's registration biometric data before receiving 216 the secure authorizing command 33. In alternate examples, the method includes first receiving the secure authorizing command 33 from the authorization server 31. The remote user host device 17, and/or the data storage device 1, can then prompt the remote user 3 to present their biometric to the biometric reader 11.

In response to receiving the secure authorizing command 33, the data storage device 1 is configured to store 230, in a memory 9 of the data storage device 1, a record 6 of a biometric authentication data set 7 of the remote user based on the received 220 registration biometric data 14 of the remote user 3. The record of the biometric authentication data set 7 enables authentication 140 of the remote user 3 and to enable access to the storage medium 15 of the data storage device 3.

As a result, the record 6 of the biometric authentication data set of the intended remote user 3 is registered at the data storage device 1, and this record 6 can be used by the remote user 3 to subsequently authenticate 240 and unlock the data storage device 1.

An advantage of this example method is that the biometric data of the remote user(s) do not need to be deposited at a central database, or transmitted over a network. This may be important in some circumstances where there is difficulty having a remote user 3 providing their biometric information at the central database or server. For example, if a remote user 3 is unable to physically travel to the server, administration building, etc. This method can also be more secure than systems where registration is entirely performed by a remote user, since registration is permissioned by the authorization server 31.

Example of Authenticating 140, 240 a Registered Remote User

A method of authenticating 140, 240 the registered remote user 3 to enable access to the storage medium 6 of the data storage device 1 will now be described with reference to FIG. 6.

The host device 17 and the data storage device 1 are communicatively coupled 112 via the communication interface 10, similar to the registration steps. In some examples, this can include connecting a physical data cable between the host device 17 and the data storage device 1.

Figure 7:
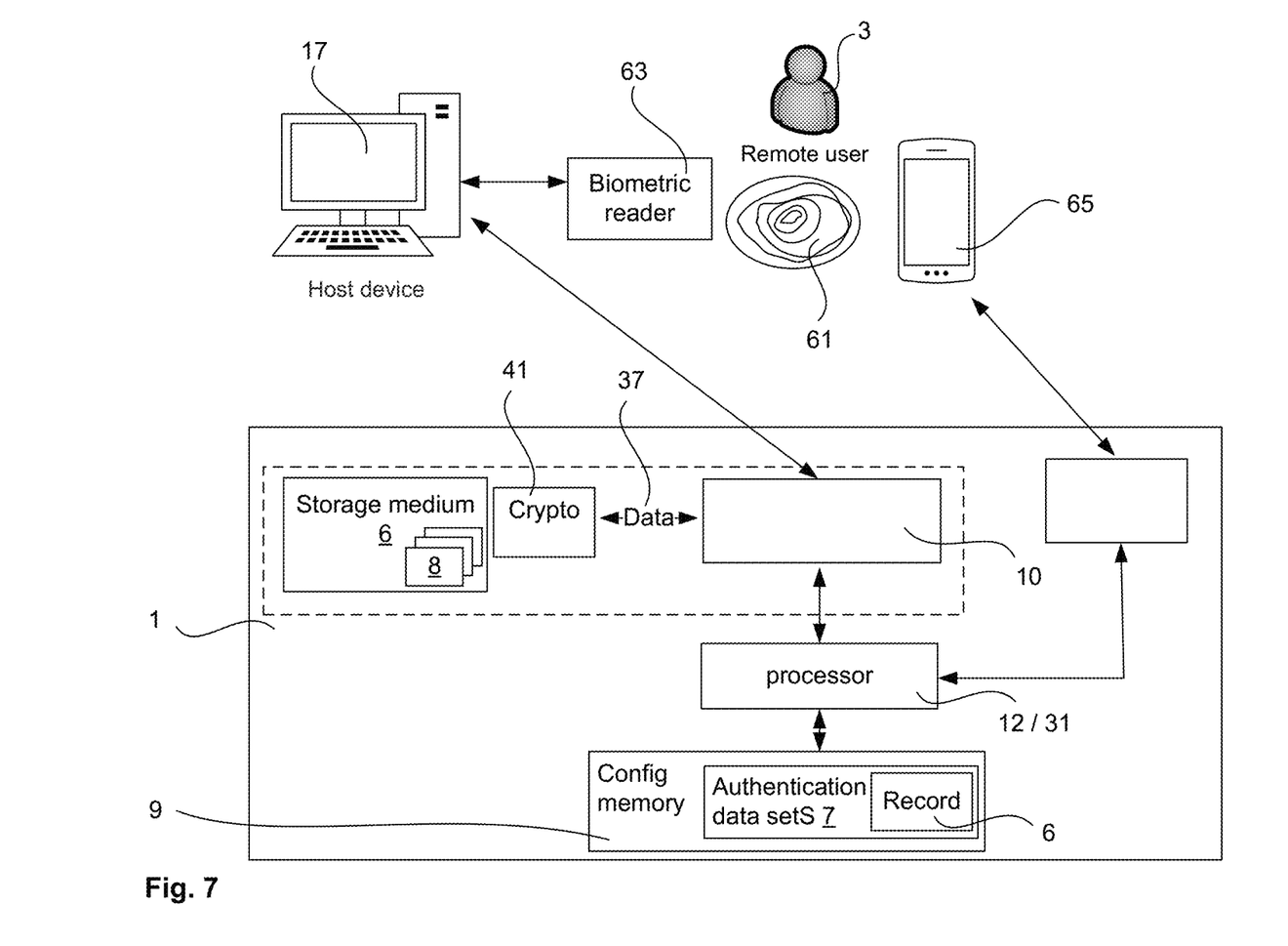
FIG. 7 illustrates a further example of a data storage device and a remote user host device with a biometric reader.

The data storage device 1 and/or the host device 1, can prompt the remote user 3 to present themselves to the biometric reader 11. This can include displaying a request at a display, via a speaker, a light, or other user interface. A biometric reader 11 scans the relevant biometric 61 of the remote user 3 and then sends biometric data 13 to be received 150 at the processor 12 of the data storage device 1. In some examples, this biometric reader 11 is integral to the data storage device 1, and can include a fingerprint scanner that scans a fingerprint of the remote user 3. In other examples, as illustrated in FIG. 7, a biometric reader 63, 65 external to the data storage device a reads the biometrics 61 of the remote user 3 and sends biometric data 13 to the processor 12.

The processor then verifies 160 that the biometric data 13 corresponds to the record 6 of the biometric authentication data set 7 of the remote user 3 that is stored in the memory 9 of the data storage device 1. This may include matching the biometric data 13 to the record 6 of the biometric authentication data set 7 to a specified confidence level.

If the processor verifies 160 that the received biometric data 13 from the purported remote user 3 correspond to the record 6, the data storage device 1 is configured to unlock 270 the data storage device to enable the remote user host device 17 to access 190 the storage medium 6. Enabling access can include one or more of reading 191, writing, and/or deleting data with the storage medium 6. It is to be appreciated that a remote user 3 or remote user host device 17 can be assigned specified access levels. For example, read only access, write only access, read and write access, etc.

In some examples the data storage device 1 is locked and unlocked by enabling or disrupting the data path 37 between the host device 17 and storage medium 6. This can include sending a physical enable signal to enable data exchange, such as to a switch, relay, or other means the enable data to pass through the data path. Conversely, a physical disable signal may be used to lock the data storage device 1. In another example, the absence of a physical enable signal may cause the data storage device 1 (or components therein) to default to disable data exchange with the connected host device 17.

In some examples, enabling access to the storage medium 6 involves encrypting and decrypting data between the host device 17 and the storage medium 6. If the remote user host device 17 reads user content data from the data storage device 1, this includes receiving encrypted user content data 48 from the storage medium 6 and generating 175 decrypted user content data 48 to be sent to the remote user host device 17.

If the remote user host device 17 writes user content data to the data storage device 1, this includes receiving user content data 8 from the host device 17 and generating 175 encrypted user content data 48 to be stored on the storage medium 6.

The encryption and decryption of user content data 8 can be performed by a cryptography engine that is configure to apply one or more cryptographic keys to encrypt and decrypt the use content data.

In some examples, the cryptographic key(s) are based, at least in part, on the record of the biometric authentication data set of the remote user 3. In other examples, the cryptographic key(s) are based, at least in part, on the received secure authorizing command 33.

When the remote user 3, or corresponding remote user host device 17, has completed tasks for the data storage device 1 the access is desirably disabled. In one example, this can include operating a user interface at the data storage device 1 to end a session such that the device is locked and further access to the storage medium 6 is disabled (until enabled again by the authentication method). In other examples, this can include physically disconnecting the connection between the remote user host device 17 and the data storage device 1, whereby in response the data storage device 1 locks further access. In another example, the data storage device 1 can include a clock or timer, whereby after a period of time from authentication the data storage device 1 locks. In yet another example, the data storage device 1 locks after a period of time of inactivity. In yet another example, the data storage device 1 is locked by the host device 17 after a specified event or input, such as a detection of a remote user signing out or locking the host device 17.

Example of Accessing User Content Data from an Initial User

In some examples, user content data is stored in the storage medium 6 before the data storage device 1 is sent to the remote user 3 and remote user device 17. For example, an initial user or administrator may wish to load data to be sent to the remote user. This can include the initial user and/or administrator registering themselves to have write access to the data storage device 1. In some examples, this can include registration and authentication techniques similar to, or a modification of, those described above for registering the remote user 3.

With the data storage device 1 communicatively coupled to an administrator host device 21 or initial user host device 23, the method can include storing initial user content data 51 to the data storage device 1. This can include the data storage device 1 receiving, the initial user content data 51 and storing the initial content data 51 in the storage medium 6.

The data storage device 1 may then be sent to the remote user 3, where the remote user 3 registers and authenticates their biometric data to the data storage device 1. Based on verification of the biometric data 13 of the remote user 3, the processor 12 is further configured to unlock the data storage device 1 to enable the remote user host device 17 to access the initial user content data 41. This may include reading 191, modifying, or deleting the initial user content data 41.

This can be advantageous as a person can store user content data in the data storage device 1 for future use by another person before that other person has registered to the data storage device. As noted above, this can be useful for collaboration where members of the team are not initially physically present to register with the data storage device. It can also enable addition of future remote users that are located geographically distant from the administrator or earlier users.

Variation—External Biometric Reader 63, 65

FIG. 7 illustrates a variation of the data storage device 1 described in the above examples. In this example, the data storage device 1 does not have an integrated biometric reader 11. Instead, biometric data is received by external biometric readers 63. This can include a biometric reader such as a phone or computer (or peripheral of a computer) so that the data storage device 1 can receive the biometric data for comparison to unlock the data storage device 1.

In one example, the biometric reader 63 is part of the host device 17 or a peripheral connected to the host device 3, wherein the biometric data 13 is sent, via the host device 17, to the processor 12 of the data storage device 1. This can include, for example, a fingerprint scanner 63 of the host device 3. In other examples, this can include a camera system to receive one or more images to determine biometric features of the user such as facial features, iris features, retina features, etc. In some examples, the host device 17 may process data from the biometric reader 63 to generate the biometric data 13 suitable for the processor 12.

In yet another example, the external biometric reader 65 may be alternative device not directly associated with the host device 17, such as a smartphone of the remote user 3. The smart phone, with a biometric reader 65, can send the biometric data 13 to the processor 12 via a wireless communication module 67 of the data storage device 1.

In some examples, the external biometric reader 63, 65 is used for registration of the remote user 3. In some examples, the use of the external biometric reader 63, 65, is used for authenticating the remote user 3 to access the data storage device 1. In some examples, the external biometric reader 63, 65 can be used for both registration and authentication.

In further examples, the data storage device 1 has a biometric reader 11 and, in addition, external biometric readers 63, 65 can be used as an alternative. This may be useful to provide redundancy if, for example, the biometric reader 11 at the data storage device 1 is damaged.

Variation—Sending a Record of a Biometric Authentication Data Set from a Remote User Host Device 17 or Other Remote User Device In the above examples, registering the record of a biometric authentication data set stored in the memory 9 may be based on:

(i) a record of a biometric authentication data set of the remote user stored at the secure data base:

(ii) registration biometric data of a remote user that is received from a biometric reader 11 integral to the data storage device 1;

(iii) registration biometric data of a remote user that is received from a biometric reader 63, 65 external to the data storage device 1, but associated with the remote user 3. This can include the remote user host device 17 or an alternative device such as a smart phone of the remote user. Biometric data received at the external reader 63, 65 is then sent to the data storage device for registration.

In yet another example, registration includes sending previously captured and stored registration data from an existing device of a remote user 3 to the data storage device 1. For example, the remote user host device 17 and/or another remote user device such as a smart phone, has an existing record of a biometric authentication data set of the remote user 3. This can be used by the remote user 3 to authenticate and access the remote user host device 17 and/or their other remote user device.

In some examples, the authorization server 31 can send 214 the secure authorizing command to enable a record of a biometric authentication data set from the remote user host device 17, or other remote user host device, to be received and stored in the memory of the data storage device 1.

Thus in this alternative example, the user's record of a biometric authentication data set is only stored at the data storage device 1 and the remote user's host device 17, or other remote user host device.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
a storage medium configured to store user content data;
a memory configured to store authentication data sets;
a communication interface to communicatively couple with one or more host devices;
at least one processor configured to, alone or in combination:
register a remote user, wherein the at least one processor is configured to, alone or in combination:
communicatively couple the communication interface to a remote user host device;
register with the remote user host device as a mass data storage device with disabled access to the storage medium, wherein disabling access to the storage medium is based on disruption of a physical data path between the storage medium and the communication interface by a switch;
receive, from a secure database and through the remote user host device, a record of a biometric authentication data set of the remote user; and
store the record of the biometric authentication data set of the remote user in the memory; and
authenticate the remote user, wherein the at least one processor is configured to, alone or in combination:
receive, from a biometric reader, biometric data of the remote user;
verify that the biometric data corresponds to the record of the biometric authentication data set of the remote user stored in the memory; and
based on verification of the biometric data of the remote user, unlock the data storage device to enable access to the storage medium for the remote user host device, wherein enabling access comprises generating a physical enable signal to operate the switch to enable the physical data path between the storage medium and the communication interface.

2. The data storage device according to claim 1, wherein receiving the record of the biometric authentication data set of the remote user is responsive to communicatively coupling the communication interface to the remote user host device.

3. The data storage device according to claim 1, wherein:
the remote user host device is configured to communicate, over a network, to the secure database to enable the at least one processor, alone or in combination, to register the remote user;
receiving the record of the biometric authentication data set of the remote user comprises receiving the record of the biometric authentication data set of the remote user from the coupled remote user host device to the data storage device;
the remote user host device is configured to send a request for the record of the biometric authentication data set; and
the secure database is configured to transmit, via the remote user host device and in response to the request, the record of the biometric authentication data set of the remote user.

4. The data storage device according to claim 1, further comprising an access controller configured to selectively set a data access state comprising:
an unlocked state to enable access to the storage medium, wherein, in the unlocked state, the access controller is further configured to generate the physical enable signal to enable data exchange through the physical data path between the storage medium and the remote user host device; and
a locked state to prevent access to the storage medium, wherein, in the locked state, the access controller is further configured to disable the physical data path to prevent data exchange between the storage medium and the remote user host device.

5. The data storage device according to claim 1, further comprising a cryptography engine configured to, responsive to the at least one processor, alone or in combination, enabling access to the storage medium:
receive user content data from one or more host devices and generate encrypted u ser content data to be stored on the storage medium; and
receive encrypted user content data from the storage medium and generate decrypted user content data to be sent to the remote user host device.

6. The data storage device according to claim 5, wherein:
the cryptography engine is further configured to apply one or more cryptographic keys to encrypt user content data and decrypt user content data; and
the one or more cryptographic keys is based, at least in part, on the record of the biometric authentication data set of the remote user.

7. The data storage device according to claim 1, further configured to:
receive, from an administrator host device or an initial user host device communicatively coupled to the data storage device, initial user content data to be accessed by the remote user; and
store the initial user content data in the storage medium, wherein, based on verification of the biometric data of the remote user, the at least one processor is further configured to, alone or in combination, unlock the data storage device to enable the remote user host device to access the initial user content data.

8. The data storage device according to claim 1 further comprising the biometric reader.

9. The data storage device according to claim 8, wherein the biometric reader is a fingerprint scanner.

10. A method of biometric authentication at a data storage device, the method comprising:
registering a remote user, wherein registering the remote user comprises:
receiving, from a biometric reader, registration biometric data of the remote user;
receiving, from an authorization server, a secure authorizing command; and
storing, in a memory of the data storage device and responsive to receiving the secure authorizing command, a record of a biometric authentication data set of the remote user based on the received registration biometric data of the remote user;
communicatively coupling a communication interface of the data storage device to a remote user host device;
registering with the remote user host device as a mass data storage device with disabled access to a storage medium of the data storage device, wherein disabling access to the storage medium is based on disruption of a physical data path between the storage medium and the communication interface by a switch;
receiving, by the data storage device and from a remote biometric reader, biometric data of the remote user;
verifying, by the data storage device, that the biometric data corresponds to the record of the biometric authentication data set of the remote user stored in the memory; and
unlocking, by the data storage device and based on verification of the biometric data of the remote user, the data storage device to enable access to the storage medium for the remote user host device, wherein enabling access comprises generating a physical enable signal to operate the switch to enable the physical data path between the storage medium and the remote user host device.

11. The method according to claim 10, wherein:
registering the remote user further comprises sending a request for the secure authorizing command to the authorization server; and
the request is accompanied by alternate authentication data.

12. The method according to claim 11, wherein the data storage device comprises the remote biometric reader.

13. The method according to claim 10, the method further comprising:
entering, by the data storage device, a locked state to prevent access to the storage medium, wherein, in the locked state, the data storage device is configured to disable the physical data path to prevent data exchange between the storage medium and the remote user host device; and
entering, by the data storage device and responsive to verification of the biometric data of the remote user, an unlocked state to enable access to the storage medium, wherein, in the unlocked state, the data storage device is configured to generate the physical enable signal to enable data exchange through the physical data path between the storage medium and the remote user host device.

14. The method according to claim 10 wherein unlocking the data storage device to enable access to the storage medium comprises enabling a cryptography engine of the data storage device for:
receiving user content data from the remote user host device and generating encrypted user content data to be stored on the storage medium; and
receiving encrypted user content data from the storage medium and generating decrypted user content data to be sent to the remote user host device.

15. The method according to claim 14, wherein:
the cryptography engine is configured to apply one or more cryptographic keys to encrypt user content data and decrypt user content data; and
the one or more cryptographic keys is based, at least in part, on the record of the biometric authentication data set of the remote user.

16. The method according to claim 14, wherein:
the cryptography engine is configured to apply one or more cryptographic keys to encrypt user content data and decrypt user content data; and
the one or more cryptographic keys is based, at least in part, on the received secure authorizing command.

17. The method according to claim 10, further comprising:
receiving, from an administrator host device or an initial user host device communicatively coupled to the data storage device, initial user content data to be accessed by the remote user; and
storing the initial user content data in the storage medium, wherein, based on verification of the biometric data of the remote user, unlocking the data storage device enables the remote user host device to access the initial user content data.

18. A data storage device comprising:
a storage medium configured for storing user content data;
a memory configured to store authentication data sets;
a communication interface to communicatively couple with one or more host devices;
means for registering a remote user, wherein registering the remote user comprises;
  receiving from an authorization server:
    a record of a biometric authentication data set of the remote user from a secure database; or
    a secure authorizing command to authorize receipt of the record of the biometric authentication data set of the remote user; and
  storing the record of the biometric authentication data set of the remote user to the memory;
means for communicatively coupling the communication interface of the data storage device to a remote user host device;
means for registering with the remote user host device as a mass data storage device with disabled access to the storage medium, wherein disabling access to the storage medium is based on disruption of a physical data path between the storage medium and the communication interface by a switch;
means for authenticating the remote user, wherein authenticating the remote user comprises:
  receiving biometric data of the remote user; and
  verifying that the biometric data of the remote user corresponds to the record of the biometric authentication data set; and
means for unlocking, based on verification of the biometric data of the remote user, the data storage device to enable access to the storage medium, wherein enabling access comprises generating a physical enable signal to operate the switch to enable the physical data path between the storage medium and the remote user host device.

* * * * *